United States Patent
Hrdina et al.

(10) Patent No.: US 7,939,457 B2
(45) Date of Patent: May 10, 2011

(54) LOW EXPANSION GLASS MATERIAL HAVING LOW EXPANSIVITY GRADIENT

(75) Inventors: Kenneth Edward Hrdina, Horseheads, NY (US); Robert Sabia, Corning, NY (US)

(73) Assignee: Corning Incorporated, Corning, NY (US)

( * ) Notice: Subject to any disclaimer, the term of this patent is extended or adjusted under 35 U.S.C. 154(b) by 284 days.

(21) Appl. No.: 12/277,611

(22) Filed: Nov. 25, 2008

(65) Prior Publication Data

US 2009/0143213 A1 Jun. 4, 2009

Related U.S. Application Data

(60) Provisional application No. 61/004,896, filed on Nov. 30, 2007.

(51) Int. Cl.
*C03C 3/06* (2006.01)
*C03C 3/04* (2006.01)

(52) U.S. Cl. .......................................... 501/54; 501/53
(58) Field of Classification Search .................. 501/53, 501/54; 65/17.4, 117
See application file for complete search history.

(56) References Cited

U.S. PATENT DOCUMENTS

| | | | |
|---|---|---|---|
| 5,755,850 A * | 5/1998 | Martin et al. .................... 65/387 |
| 6,465,272 B1 | 10/2002 | Davis, Jr. et al. | |
| 6,542,224 B2 | 4/2003 | Ackerman et al. | |
| 2003/0226377 A1 | 12/2003 | Barrett et al. | |
| 2004/0045318 A1 | 3/2004 | Hrdina et al. | |
| 2005/0026768 A1 | 2/2005 | Shimizu et al. | |
| 2006/0179879 A1 * | 8/2006 | Ellison et al. .................. 65/17.4 |
| 2006/0276323 A1 * | 12/2006 | Iwahashi et al. ................ 501/54 |
| 2007/0042893 A1 * | 2/2007 | Koike et al. ..................... 501/54 |
| 2007/0137253 A1 | 6/2007 | Beall et al. | |

* cited by examiner

*Primary Examiner* — Jerry Lorengo
*Assistant Examiner* — Noah S Wiese
(74) *Attorney, Agent, or Firm* — Walter M. Douglas

(57) ABSTRACT

A low expansion glass substrate includes titania and silica and has a thermal expansivity with an average gradient less than 1 ppb/° C./° C. in a temperature range of 19° C. to 25° C.

9 Claims, 4 Drawing Sheets

LOW EXPANSION GLASS MATERIAL HAVING LOW EXPANSIVITY GRADIENT

CROSS-REFERENCE TO RELATED APPLICATIONS

This application claims the benefit of priority under 35 U.S.C. §119(e) of U.S. Provisional Application Ser. No. 61/004,896 filed on Nov. 30, 2007.

FIELD

The invention relates to glass materials suitable for use in making optical elements for extreme ultraviolet lithography (EUVL) systems operating at or below 200 nm, and especially at or below 157 nm. More specifically, the invention relates to glass materials suitable as mask blanks for EUVL systems operating at or below 200 nm, and especially at or below 157 nm.

BACKGROUND

Extreme ultraviolet lithography (EUVL) systems allow imaging of small-dimensioned features onto substrates and are useful in production of integrated circuits with submicron features. EUVL systems used in the production of integrated circuits have progressed towards shorter optical wavelengths, such as from 248 nm to 193 nm to 157 nm. EUVL systems operating at optical wavelengths at or below 120 nm are currently contemplated. In a typical EUVL system, a condenser system including mirrors collects, shapes, and filters radiation from an extreme ultraviolet (EUV) radiation source to achieve a highly uniform intense beam. The beam is then projected onto a mask containing a pattern to be replicated onto a silicon wafer. The mask reflects the EUV radiation into a reduction imaging system including an assembly of reflective mirrors. The reflective mirrors image the mask pattern and focus the mask pattern onto a resist coating on the silicon wafer. The mask pattern is later transferred to the silicon wafer by etching. For lithographic processes at 248 nm and 193 nm, optical elements such as stepper lenses used in passing light through the mask to form an image of the mask pattern could be made from very pure fused silica. At 157 nm, the fused silica elements are replaced by elements made from Group IIA alkaline earth metal fluorides, such as calcium fluoride, because fused silica has high absorption at 157 nm. For EUVL systems operating at or below 120 nm, there are no known isotropic materials that are transparent at these very short wavelengths. As a result, reflective optics is used instead of conventional focusing optics.

Reflective optics for a EUVL system typically includes a reflective multilayer stack having alternating layers of Molybdenum and Silicon or Molybdenum and Beryllium. The reflective multilayer stack is formed on a substrate having minimum surface roughness. A proposed surface roughness is on the order of less than 0.3 nm rms over 10 mm spacing, and more preferably, less than 0.2 nm rms over 10 μm spacing. An absorber may be formed on the reflective multilayer stack to complete a EUVL mask, where the absorber defines the pattern to be replicated on a wafer, such as a silicon wafer. The substrate for the reflective optics may be made of silicon or glass or other suitable substrate material. In general, it is important that the material used for the substrate has a low coefficient of thermal expansion so that the substrate does not distort under exposure to EUV radiation. It is also important that the material used for the substrate has low absorption at the exposure wavelength. Otherwise, the substrate would heat up and cause distortion and pattern placement errors at the wafer.

The thermal expansion properties of the substrate for EUVL optics and photomasks must be carefully controlled because of the very short wavelengths involved. In particular, it is important that the temperature sensitivity of the coefficient of thermal expansion (CTE) and the range of change of the CTE with temperature are kept as low as possible in the normal operating temperature range of the lithographic process, which is in a general range of 4 to 40° C., preferably 20 to 25° C., with approximately 22° C. being the target temperature. At present, there are only two known commercially available substrate materials that will satisfy the CTE constraints. These are ULE® glass, available from Corning Incorporated, Corning, N.Y., and ZERODUR® glass, available from Schott Lithotec AG, Mainz, Germany. While both are low expansion materials, ULE® glass is a single-phase glass material that is easier to polish. However, despite the advances in low expansion substrate materials, distortion of the written surface of the mask due to heating of the mask during exposure remains a concern. To minimize distortion of the written surface, it is desirable to minimize the thermal gradient through the mask thickness during exposure.

SUMMARY

In one aspect, the invention relates to a low expansion glass substrate comprising titania and silica and having a thermal expansivity with an average gradient less than 1 ppb/° C./° C. in a temperature range of 19° C. to 25° C. at the use temperature. In a further aspect the invention is directed to a low expansion glass substrate having a zero-CTE crossover greater than 30° C. such that the CTE at or near the surface of a mask/optic is less than 20 ppb/° C. and the CTE gradient across the thermally non-uniform dimension is less than 1 ppb/° C. Reduction in the CTE gradient, maintaining near-zero CTE results in the elimination of distortion of the written pattern of the mask.

Other features and advantages of the invention will be apparent from the following description and the appended claims.

BRIEF DESCRIPTION OF THE DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

DETAILED DESCRIPTION

Figure 1:
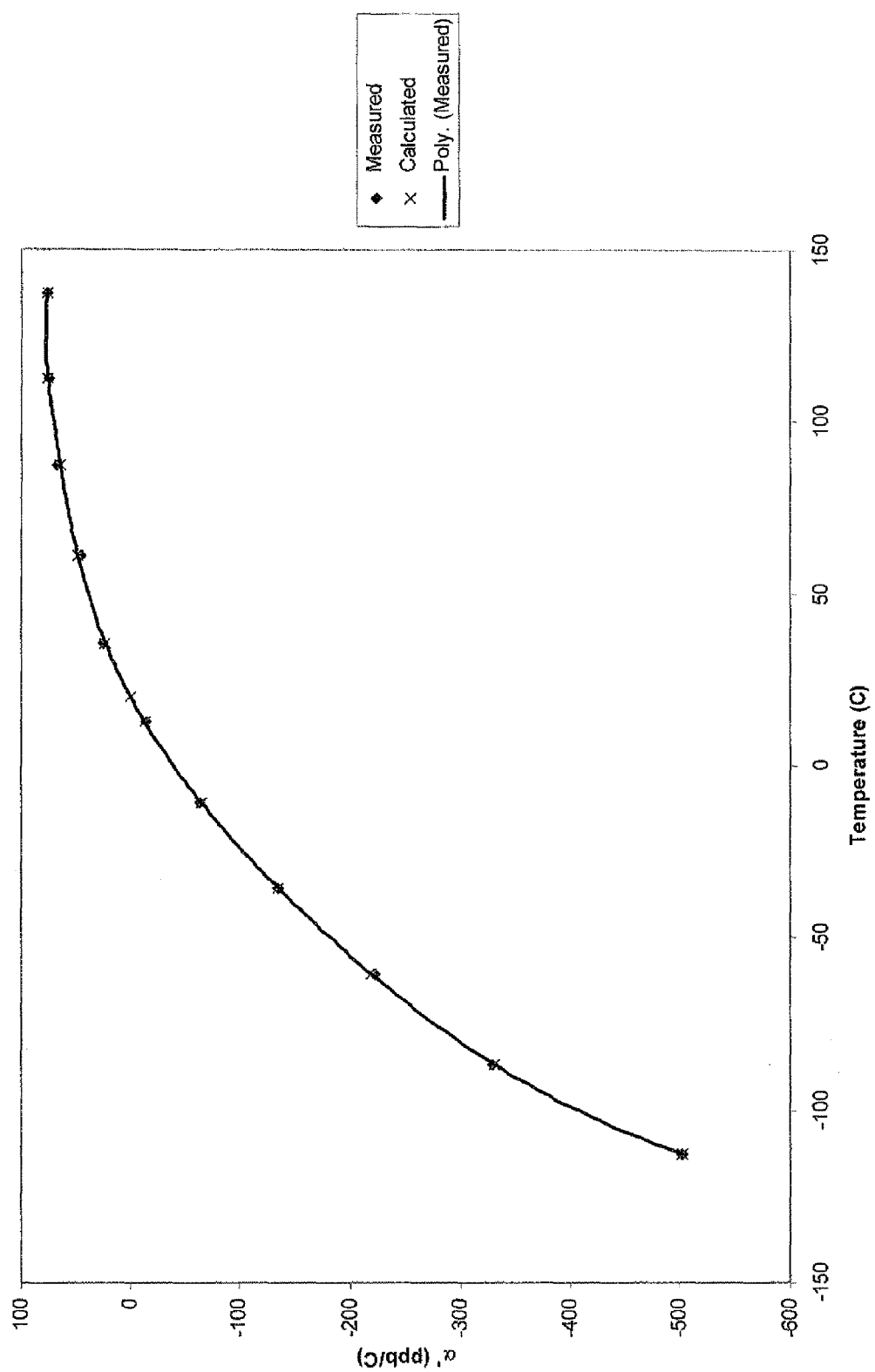
FIG. 1 is a thermal expansivity curve for a glass substrate having a zero-CTE crossover temperature of 20° C.

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

Thermal gradient through a EUVL mask substrate during exposure is dictated by both the energy absorbed in the mask substrate and by the thermal conductivity properties of the mask substrate. The mask substrate can become distorted when there is a non-zero coefficient of thermal expansion (CTE) at the front surface or the back surface of the mask substrate and non-zero stress somewhere along the thickness of the mask substrate. Stress along the thickness of the mask substrate is typically due to thermal gradient or variations in CTE along the thickness of the mask substrate. Current EUVL mask designs call for a mask substrate having zero-CTE crossover temperature of 20° C. and a CTE range of 0±5 ppb/° C. through the entire mask at 20-25° C. Herein, zero-CTE crossover temperature is defined as the temperature at which the expansivity of the instantaneous CTE of the mask substrate is 0 ppb/° C. Recent modeling studies of EUVL operating conditions suggest that the mask substrate might see as much as a 50° C. thermal gradient through the thickness of the mask substrate, between the front surface and the back surface of the mask substrate. For the current EUVL mask design, such thermal gradient would result in significant distortion of the mask substrate, and consequently distortion of the mask pattern which is to be printed on a wafer.

For illustration purposes, assume a 50° C. thermal gradient through the thickness of a mask substrate, where the mask substrate has a zero-CTE crossover temperature of 20° C. and a CTE range of 0±5 ppb/° C. through the entire mask at 20-25° C. FIG. 1 shows a thermal expansivity curve, i.e., CTE versus temperature, for such a mask substrate. At 5° C., the gradient of the expansivity curve is 2.11 pbb/° C./° C. At 20° C., the gradient of the expansivity curve is 1.69 pbb/° C./° C. At 35° C., the gradient of the expansivity curve is 1.30 ppb/° C./° C. In a temperature range from 5° to 35° C., the average gradient of the expansivity curve is greater than 1 pbb/° C./° C. Further, assume one of two scenarios where either the front surface of the mask substrate or the back surface of the mask substrate is held at a zero-CTE crossover temperature of 20° C., as currently specified for EUVL masks. The mask substrate would have thermal gradients and surface CTE values as shown in Table 1. Either scenario suggests a high degree of stress induced by non-uniform CTE and non-zero CTE at the mask surface, and thus distortion of the written surface.

TABLE 1

|  | Scenario A | Scenario B |
|---|---|---|
| Front-side temperature | 20° C. | 70° C. |
| Backside temperature | −30° C. | 20° C. |
| CTE gradient though mask thickness | 117.7 ppb/° C. | 54.9 ppb/° C. |
| CTE at mask surface | 0.1 ppb/° C. | 54.9 ppb/° C. |

The invention provides a low expansion glass substrate having a thermal expansivity with an average slope less than 1 ppb/° C./° C. over a selected set of temperatures (the use temperatures). Thermal expansivity, also sometimes referred to as instantaneous coefficient of linear expansion, is as defined in ASTM E228-95 and can be represented by the equation:

$$\alpha_T = 1/L_i \underset{T_2 \to T_1}{\text{Limit}} (L_2 - L_1) \Big/ (T_2 - T_1) = (dL/dT)/L_i (T_1 < T_i < T_2) \quad (1)$$

In equation (1), L is length and T is temperature. The low expansion glass substrate also has a surface or near-surface CTE less than 20 ppb/° C. over the selected set of temperatures, where near-surface is defined as less than 1 mm below the surface. In one embodiment, the selected set of temperatures is in a range from 19° C. to 25° C., and more generally in a range from 5 to 35° C. For The low expansion glass substrate comprises titania and silica and has a zero-CTE crossover temperature much greater than 20° C. The desirable properties of the low expansion glass substrate are achieved by adjusting the amount of titania in the substrate. In one embodiment, the titania content of the glass material is greater than 7.4 wt %, with silica accounting for the remainder of the content of the glass material. In another embodiment, the titania content of the glass material is in a range from 7.5 wt % to 9 wt %, with silica accounting for the remainder of the content of the glass material. In yet another embodiment, the titania content of the glass material is in a range from 8 wt % to 8.5 wt %, with silica accounting for the remainder of the content of the glass material. In other embodiments, the glass material may include other dopants in addition to titania, such as zirconium, yttrium, aluminum, cerium, tantalum, germanium, chlorine, and fluorine. These other dopants may be present in the glass in an amount from 0.005 wt % to 1.0 wt %, with titania and silica accounting for the remainder of the content of the glass as described above. Alternatively, these other dopants may be present in the glass in an amount from 0.5 wt % to 1.0 wt %, with titania and silica accounting for the remainder of the content of the glass as described above. In some embodiments, the low expansion glass substrate has a mean CTE of about 0±5 ppb/° C. in a temperature range of 19° C. to 25° C. In some embodiments, the low expansion glass substrate is polishable to less than 0.15 nm rms.

Figure 2:
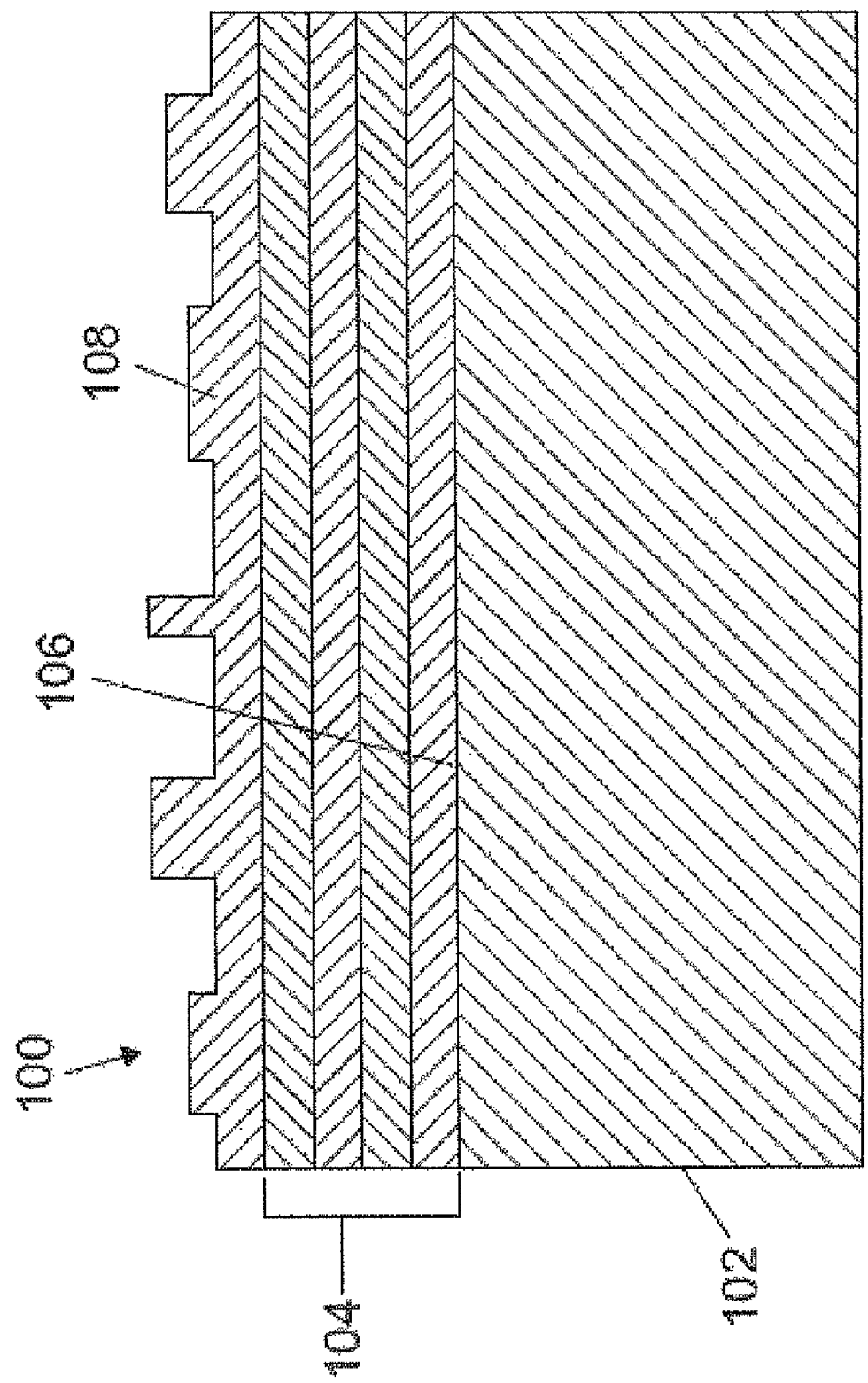
FIG. 2 is a cross-section of a EUVL mask.

The low expansion glass substrate as described above can be used as a mask substrate or blank. FIG. 2 shows a EUVL mask 100 including a mask substrate 102, made from a low expansion glass substrate as described above. The mask substrate 102 is planar. Reflective optics 104 is formed on a surface 106 of the mask substrate 102. For discussion purposes, the surface 106 on which the reflective optics 104 is formed may be referred to as the front surface or top surface of the mask substrate. Reflective optics 104 may include a reflective multilayer stack having alternating layers of Molybdenum and Silicon or Molybdenum and Beryllium or other suitable materials. The front surface 106 of the mask substrate 102 on which the reflective optics 104 is formed preferably has a minimum surface roughness, typically on the order of less than 0.3 nm rms over 10 mm spacing, and more preferably, less than 0.2 nm rms over 10 μm spacing. An absorber 108 defining the pattern to be replicated on a wafer, such as a silicon wafer, may be formed on the reflective optics 104. The mask substrate 102 has the desirable properties described above for the low expansion glass substrate. Accordingly, distortion of the pattern to be replicated on a wafer is avoided or minimized.

Table 2 shows properties of exemplary low expansion glass materials according to the invention. The temperatures at the front and back surfaces of the substrate are calculated assuming a 50° C. thermal gradient from the front surface to the back surface of the substrate. The examples shown in Table 2 include glass materials having a zero-CTE crossover temperature of 80° C. and 90° C. The CTE data reported in Table 2 are modeled data.

TABLE 2

| Zero-CTE Temp | % TiO$_2$ /% SiO$_2$ | Temperature at front surface of substrate | Temperature at back surface of substrate | CTE Gradient through substrate | CTE at surface of the substrate |
|---|---|---|---|---|---|
| 80° C. | 8.4/91.6 | 80° C. | 30° C. | 45.6 ppb/° C. | 0.1 ppb/° C. |
|  |  | 90° C. | 40° C. | 37.6 ppb/° C. | 5.1 ppb/° C. |
|  |  | 100° C. | 50° C. | 31.7 ppb/° C. | 9.8 ppb/° C. |
|  |  | 130° C. | 80° C. | 17.2 ppb/° C. | 17.3 ppb/° C. |
| 90° C. | 8.5/91.5 | 90° C. | 40° C. | 37.6 ppb/° C. | 0 ppb/° C. |
|  |  | 115° C. | 65° C. | 25.0 ppb/° C. | 10.5 ppb/° C. |
|  |  | 140° C. | 90° C. | 8.4 ppb/° C. | 8.4 ppb/° C. |

Figure 3:
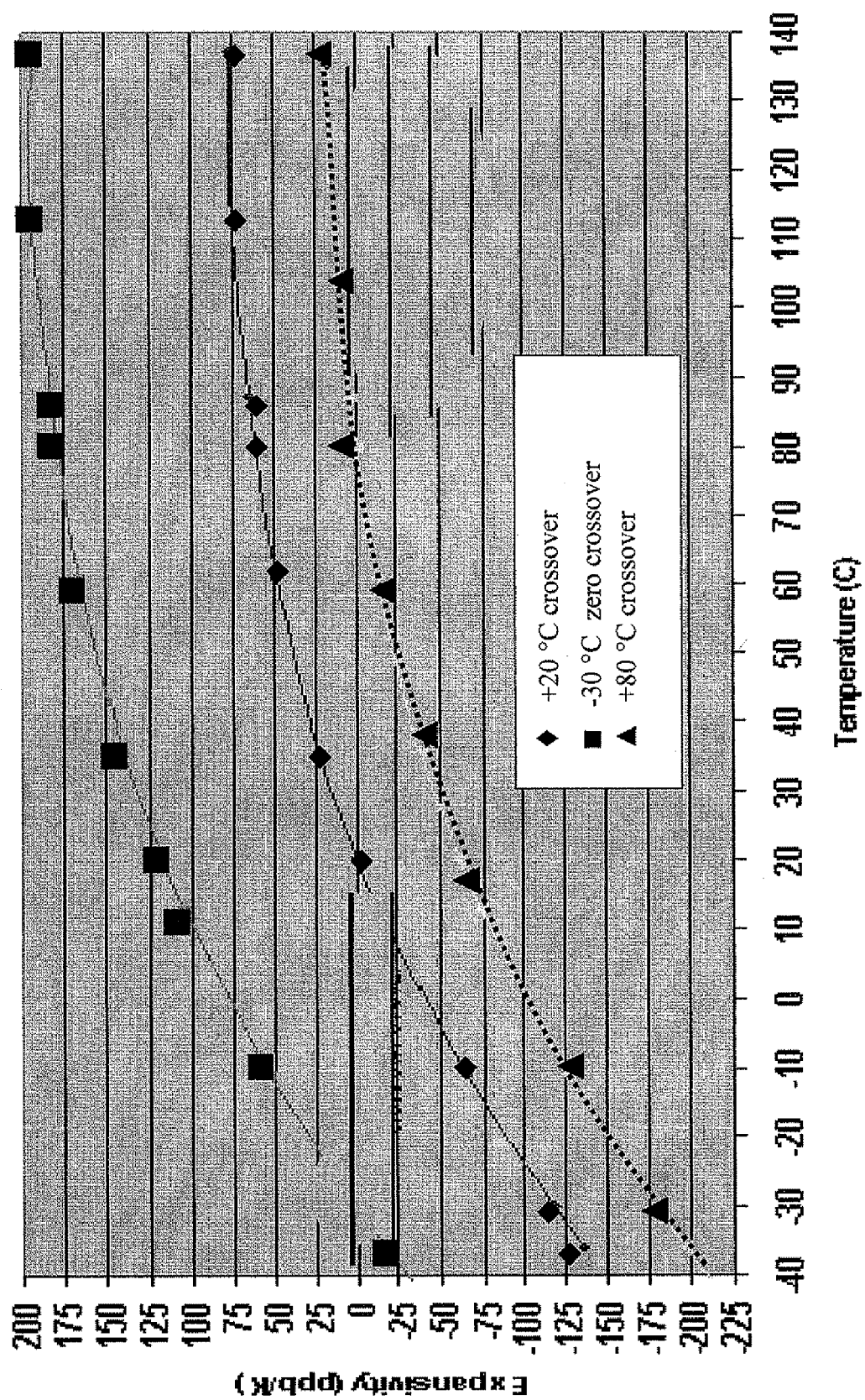
FIG. 3 is a comparison of thermal expansivity curves for glass substrates having zero-CTE crossover temperature of −30° C., 20° C., and 80° C.
Figure 4:
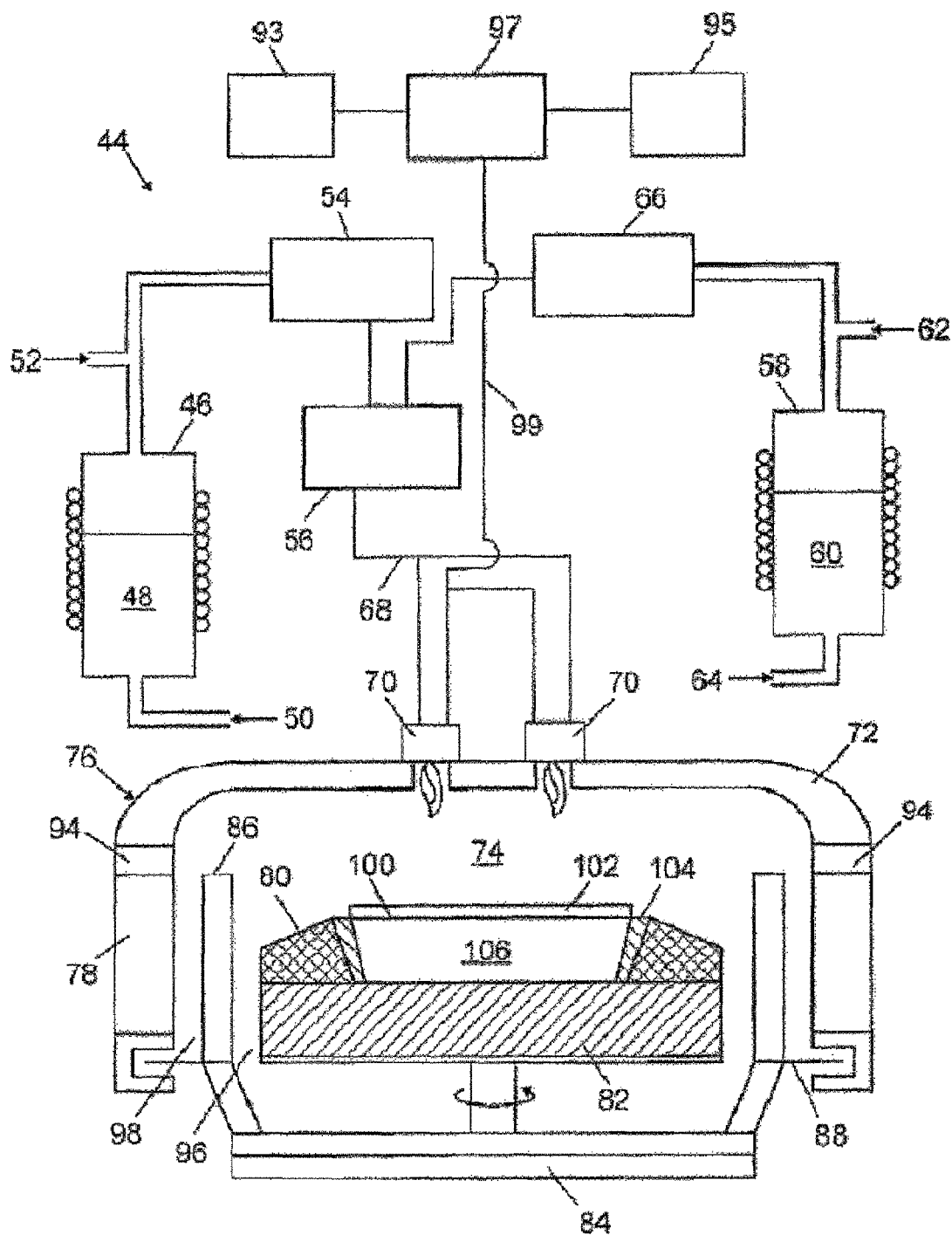
FIG. 4 depicts a setup for making titania-doped silica glass.

FIG. 3 is a comparison of thermal expansivity curves for a glass substrate having a zero-CTE crossover temperature of 20° C., a glass substrate having a zero-CTE crossover temperature of −30° C., and a glass substrate as in the invention having a zero-CTE crossover temperature of 80° C. The zero-CTE crossover temperature at 20° C. and −30° C. are provided for comparison purposes only. As discussed above, the low expansion glass substrate of the invention has a zero-CTE crossover temperature much greater than 20° C. The expansivity curve having a zero-CTE crossover temperature of 20° C. was generated from measured data. The glass substrate exhibiting this behavior had a titania content of 7.4 wt % and a silica content of 92.6 wt %. The expansivity curves having a zero-CTE crossover temperature of −30° C. and a zero-CTE crossover temperature of 80° C. were generated from modeled data. The glass substrate exhibiting a zero-CTE crossover temperature of −30° C. had a titania content of 5.1 wt % and silica content of 94.9 wt %. The glass substrate exhibiting a zero-CTE crossover temperature of 80° C. had a titania content of 8.4 wt % and a silica content of 91.6%. FIG. 4 shows that the glass substrate having a zero-CTE crossover temperature at 80° C. has low expansivity over a range of temperatures as compared to glass substrates having a zero-CTE crossover temperature at 20° C. and −30° C., respectively. Table 3 shows a comparison between the properties of the glass substrates whose expansivity curves are shown in FIG. 3, assuming a 50° C. thermal gradient between the front surface and the back surface of the substrate.

TABLE 3

| Zero-CTE Crossover Temp | % TiO$_2$ /% SiO$_2$ | Temperature at front surface of substrate | Temperature at back surface of substrate | CTE Gradient through substrate | CTE at surface of the substrate |
|---|---|---|---|---|---|
| −30° C. | 5.1/94.9 | 20° C. | −30° C. | 117.3 ppb/° C. | 118 ppb/° C. |
| 20° C. | 7.4/92.6 | 20° C. | −30° C. | 117.7 ppb/° C. | 0.1 ppb/° C. |
|  |  | 45° C. | −5° C. | 85.0 ppb/° C. | 34.1 ppb/° C. |
|  |  | 70° C. | 20° C. | 54.9 ppb/° C. | 54.9 ppb/° C. |
| 80° C. | 8.4/91.6 | 80° C. | 30° C. | 45.6 ppb/° C. | 0.1 ppb/° C. |
|  |  | 90° C. | 40° C. | 37.6 ppb/° C. | 5.1 ppb/° C. |
|  |  | 100° C. | 50° C. | 31.7 ppb/° C. | 9.8 ppb/° C. |
|  |  | 130° C. | 80° C. | 17.2 ppb/° C. | 17.3 ppb/° C. |
| 90° C. | 8.5/91.5 | 90° C. | 40° C. | 37.6 ppb/° C. | 0 ppb/° C. |
|  |  | 115° C. | 16° C. | 25.0 ppb/° C. | 10.5 ppb/° C. |
|  |  | 140° C. | 90° C. | 8.4 ppb/° C. | 8.4 ppb/° C. |

A low expansion glass material according to the invention can be made using any suitable method that would yield a glass material having a homogeneous composition and property distribution. Examples of such methods include soot-to-glass, chemical vapor deposition, plasma induction, and sol-gel processes. In one example, which is not to be construed as limiting the invention as otherwise described herein, the low expansion glass is made by plasma induction. The method includes introducing plasma-generating gases, such as argon, oxygen, air, and mixtures thereof, into a plasma production zone defined by a reaction tube. An induction coil surrounding the reaction tube generates high-frequency alternating magnetic field within the plasma production zone which ionizes the plasma-generating gases to produce a plasma flame. Injectors are used to project a silica precursor and a titania precursor into the plasma flame. The silica precursor may be any compound containing silicon, such as silica powder, silicon tetrachloride (SiCl$_4$), or octamethylcyclotetrasilohexane (OMCTS). The titania precursor may be any compound containing titanium, such as titania powder, titanium isoproxide (Ti(OPri)$_4$), or titanium tetrachloride (TiCl$_4$). The silica and titania precursors are converted into fine titania-doped silica particles in the plasma flame. The titania-doped silica particles are deposited on a deposition surface, which is usually made of silica. Typically, the deposition surface is rotated as the particles are deposited. The atmosphere in the reaction tube may be controlled and sealed such that a glass that is substantially free of water may be produced. If desired, other dopants can be injected into the reaction tube together with the silica and titania precursors.

In another example, as illustrated in FIG. 4, a source 46 of a silica precursor 48 and a source 58 of a titania precursor 60 are provided. The silica precursor 48 and titania precursor 60 are typically siloxanes, alkoxides, and tetrachlorides. One particularly commonly used silica precursor is OMCTS. One particularly commonly used titania precursor is Ti(OPri)$_4$. The sources 46, 58 may be vaporizers, evaporation tanks, or other equipment suitable for converting the precursors 48, 60 into vapor form. A carrier gas 50, such as nitrogen, is introduced at or near the base of source 46. The carrier gas 50 entrains the vapors of the silica precursor 48 and passes through a distribution system 54 to a mixing manifold 56. A by-pass stream of carrier gas is introduced at 52 to prevent saturation of the vaporous silica precursor stream. A stream of inert gas 62, e.g., nitrogen, can be brought into contact with the vaporous titania precursor to prevent saturation of the vapors. An inert carrier gas 64, e.g., nitrogen, entrains the titania precursor 60 vapors and carries the vapors through a distribution system 66 to the mixing manifold 56, where they are mixed with the silica precursor 48 vapors. Alternatively, the titania precursor 60 and the silica precursor 48 may be delivered to the mixing manifold 56 in liquid form. The mixture in the mixing manifold 56 passes through heated fume lines 68 to the burners 70 mounted on the furnace crown 72. In this illustration, two burners 70 are shown. However, more than two burners can be used to allow for better heat control and distribution of material across the deposition cavity 74. The furnace 76 may have rotation and oscillation capabilities and may include a stationary wall 78, which supports the crown 72. A containment vessel 80 is disposed within the stationary wall 78. The containment vessel 80 includes a base 82 which is supported for rotation and which also oscillates through its attachment to an oscillation table 84. The containment vessel 80 is surrounded by an air flow wall 86 which is mounted on the oscillation table 84. A motion accommodating seal 88 is formed between the stationary wall 78 and the containment vessel 80. The deposition cavity 74 is vented by draft ports 94 formed at the top of the stationary wall 78. The draft ports 94 are connected to a suitable exhaust system (not shown) by ducting which creates a negative pressure in the deposition cavity 74 with respect to ambient pressure. Fuel 93 and oxygen 95 are premixed in the premixing chamber 97 and then transferred to the burners 70 through fume lines 99. The burners 70 ignite the fuel/oxygen mixture to produce a flame which heats the deposition cavity 74. The vaporous reactants injected into the burners 70 exit the burners 70 where they react and form titania-doped silica particles via flame hydrolysis or pyrolysis. The soot is directed downwardly and deposited on a planar surface 100, as shown at 102. The planar surface 100 may be provided by filling the liner 104 of the containment vessel 80 with cleaned cullet 106, although other means of providing a planar surface, such as a glass plate, may also be used. As the soot is deposited, the containment vessel 80, and hence the planar surface 100, is rotated and oscillated through the base 82 to improve index homogeneity of the silica. During soot deposition, the furnace 76 is draft with ambient air flows, which can be filtered if desired. The temperature of the deposition cavity 74 is monitored and held at desired processing temperatures by adjusting the vertical position of the containment vessel 80. The soot particles 102 consolidate into a titania-doped silica glass inside the furnace 76. If desired, non-uniform reactions which may result in large variations in the CTE of the glass may be minimized by keeping the processing temperatures below that which is required for full consolidation of the soot particles 102. After deposition, the soot particles 102 can then be consolidated into glass.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A low expansion glass substrate comprising titania and silica, the low expansion glass substrate having a thermal expansivity with an average gradient less than 1 ppb/° C./° C. over at least a use temperature range of 5° C. to 35° C. and a zero coefficient of thermal expansion (CTE) crossover temperature in a range from greater than 25° C. to 90° C.

2. The low expansion glass substrate of claim 1, wherein the zero CTE crossover temperature is greater than 30° C.

3. The low expansion glass substrate of claim 1, having a coefficient of thermal expansion (CTE) at or near a surface thereof less than 20 ppb/° C. with the zero CTE crossover temperature being greater than 30° C.

4. The low expansion glass substrate of claim 1, wherein the zero coefficient of thermal expansion crossover temperature is in a range from 70-90° C.

5. The low expansion glass substrate of claim 1, wherein the zero coefficient of thermal expansion crossover temperature is in a range from 40-70° C.

6. The low expansion glass substrate of claim 1, having a mean coefficient of thermal expansion 0 ±5 ppb/° C. at the use temperature.

7. The low expansion glass substrate of claim 1, having a titania content greater than 7.4 wt %.

8. The low expansion glass substrate of claim 1, having a titania content in a range from 7.5 wt % to 9 wt %.

9. The low expansion glass substrate of claim 1, having a titania content in a range from 8 wt % to 8.5 wt %.

* * * * *